US010944902B2

(12) United States Patent
Parasnis et al.

(10) Patent No.: US 10,944,902 B2
(45) Date of Patent: Mar. 9, 2021

(54) DIGITAL IMAGE GENERATION USING CAPTURE SUPPORT DATA

(71) Applicant: Adobe Inc., San Jose, CA (US)

(72) Inventors: Abhay Vinayak Parasnis, Los Altos, CA (US); Oliver I. Goldman, Seattle, WA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 15/628,358

(22) Filed: Jun. 20, 2017

(65) Prior Publication Data

US 2018/0367729 A1    Dec. 20, 2018

(51) Int. Cl.
| | | |
|---|---|---|
| *H04N 5/232* | (2006.01) | |
| *G06T 7/62* | (2017.01) | |
| *G06T 7/73* | (2017.01) | |
| *G06T 11/60* | (2006.01) | |
| *G06T 11/00* | (2006.01) | |
| *G06F 16/51* | (2019.01) | |

(52) U.S. Cl.
CPC ............ *H04N 5/23232* (2013.01); *G06T 7/62* (2017.01); *G06T 7/73* (2017.01); *G06T 11/00* (2013.01); *G06T 11/60* (2013.01); *H04N 5/23229* (2013.01); *G06F 16/51* (2019.01)

(58) Field of Classification Search
CPC .............................. H04N 5/23232; G06T 7/62
See application file for complete search history.

(56) References Cited

U.S. PATENT DOCUMENTS

| | | | | |
|---|---|---|---|---|
| 7,321,391 | B2* | 1/2008 | Ishige .................. | H04N 1/3872 |
| | | | | 348/218.1 |
| 8,682,097 | B2* | 3/2014 | Steinberg .................. | G06T 5/50 |
| | | | | 382/275 |
| 9,704,250 | B1* | 7/2017 | Shah ...................... | G06T 7/0065 |
| 2009/0087123 | A1* | 4/2009 | Izawa ................ | G06K 9/00228 |
| | | | | 382/284 |
| 2012/0224787 | A1* | 9/2012 | Imai ...................... | H04N 5/2352 |
| | | | | 382/274 |
| 2012/0281132 | A1* | 11/2012 | Ogura ...................... | G06T 5/003 |
| | | | | 348/348 |
| 2016/0057363 | A1* | 2/2016 | Posa ...................... | H04N 5/272 |
| | | | | 348/239 |
| 2016/0073040 | A1* | 3/2016 | Jen ............................ | G06T 7/10 |
| | | | | 348/239 |
| 2016/0328872 | A1* | 11/2016 | Hauswiesner .......... | G06T 11/60 |
| 2017/0256040 | A1* | 9/2017 | Grauer ...................... | G06T 5/50 |
| 2018/0367752 | A1* | 12/2018 | Donsbach .......... | G06K 9/00664 |

* cited by examiner

*Primary Examiner* — Sinh Tran
*Assistant Examiner* — Zhenzhen Wu
(74) *Attorney, Agent, or Firm* — Fig. 1. Patents

(57) ABSTRACT

Digital image generation through use of capture support data is described. In one example, an image capture device is configured to obtain capture support data from an imaging support system via a network through inclusion of a pre-capture system. The pre-capture system, for instance, is configured to obtain capture support data from an imaging support system via a network. The capture support data is configured for use by digital image processor along with raw image data received from an image sensor to generate a digital image, e.g., that is configured for rendering.

20 Claims, 7 Drawing Sheets

700

DIGITAL IMAGE GENERATION USING CAPTURE SUPPORT DATA

BACKGROUND

Digital image generation has become an increasing part of a user's everyday life as a direct result of exposure to a wide range of devices that include this functionality. This includes exposure to dedicated image capture devices as well as image capture devices incorporated as part of mobile phones, tablets, personal computers, and so forth. Because of this, designers and manufacturers of image capture devices continually strive to expand functionality available via these image capture devices to further differentiate these devices from each other.

One example of this is to include image editing functionality as part of a digital image processor of the image capture device. Therefore, generation of the digital image by the digital image processor into a ready-for-rendering format (e.g., for rendering by a display device, printer) may also include editing of the image, e.g., high dynamic range (HDR) imaging, noise removal, and so forth. To do so, conventional image capture devices have been designed to generate the digital image through use of a "closed system".

However, a result of the editing as part of the actual generation of the digital image is that subsequent image editing and processing techniques are limited to access of this already edited version of the digital image. Consequently, subsequent image editing techniques in this conventional example are forced to address not only how the image was captured but also editing that may be performed as part of this capture. Because of the use of the closed-system in conventional techniques, however, knowledge of how the editing is performed may not be readily available. Although techniques have been developed to save an image in a raw data format, these techniques thus force the user into an "either or" scenario to choose between access to the expanded functionality made available by the image capture device or forgo this access altogether and use the raw data format.

SUMMARY

Digital image generation through use of capture support data is described. In one example, an image capture device is configured to obtain capture support data from an imaging support system via a network through inclusion of a pre-capture system. The pre-capture system, for instance, is configured to obtain capture support data from an imaging support system via a network. The capture support data is configured for use by digital image processor along with image data received from an image sensor (e.g., raw image data from a charge-coupled device) to generate a digital image that is configured for rendering. Other examples are also contemplated in which image data is processed that is in a renderable form.

In this way, the capture support data may be used to supplement and guide processing of the raw image data yet still take advantage of functionality that may be provided "internally" by the digital image processor to generate the digital image. The capture support data may be used to support a variety of functionality, including object removal, hole filling, may specify settings used to capture the image data, color palettes, lighting effects, filters, saturation, and so forth. In this way, the digital image processor is provided which an increased variety of data that is not available using conventional techniques through inclusion of the pre-capture system.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
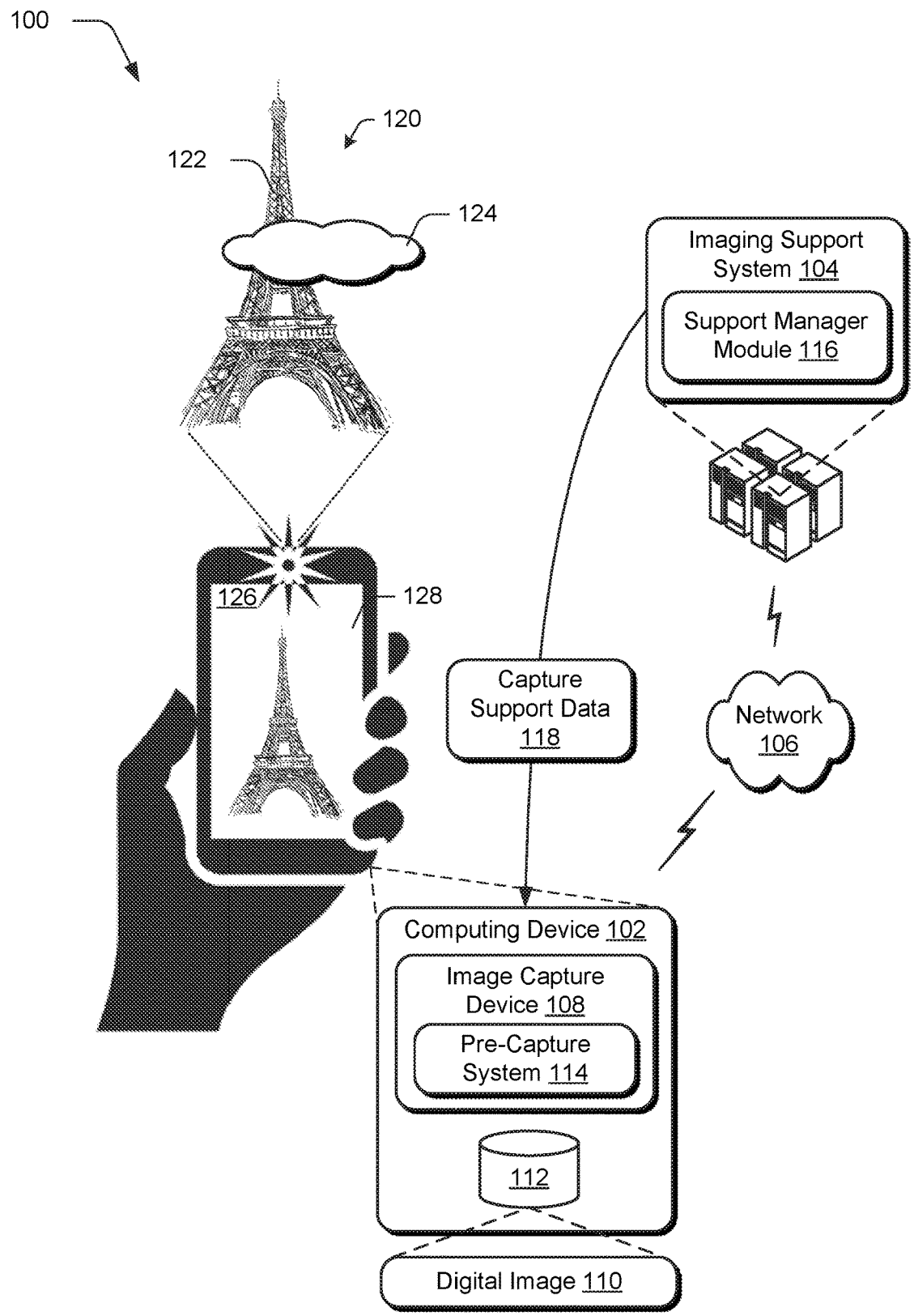
FIG. 1 is an illustration of an environment in an example implementation that is operable to employ pre-capture techniques described herein.

Techniques and systems are described in which capture support data is used to supplement or guide processing of image data (e.g., raw image data) into a digital image that is configured for rendering, e.g., by a display device, printer, and so forth. In this way, availability of image processing techniques by an image capture device may be expanded and yet preserve functionality made available by a "closed system" that may be specific to particular image capture devices, e.g., noise removal, HDR support, and so forth.

In one example, the image capture device includes a pre-capture system. The pre-capture system is configured to obtain capture support data that is usable to supplement and/or guide generation of a digital image from image data, e.g., raw image data obtained from an image sensor of the image capture device. As a result, the capture support data is provided "upstream" of the digital image processor in this example. This may be contrasted with conventional techniques that are limited to image editing that is performed as part of the generation of the digital image and/or after generation of the digital image by the digital image processor.

Image capture device manufacturers and designers, for instance, typically design the image capture device as an "image pipeline" that includes components to focus light (e.g., a lens and aperture), convert the light into an analog signal (e.g., an image sensor), convert the analog signal into a digital signal as raw image data (e.g., an analog/digital converter), and then generate a digital image that is configured for rendering through use of a digital image processor, e.g., a microcontroller, digital signal processor, or imaging core. As part of generating the digital image, the digital image processor may also perform one or more image editing techniques, e.g., generate the digital image as employing a high dynamic range, noise removal, and so forth. Conventional image editing techniques, however, are limited to access of this edited form of the digital image or a raw data format of the digital image in which editing has not been performed and is not configured for rendering.

Accordingly, a pre-capture system is described that is configured to obtain capture support data that may be used along with raw image data as part of generating a digital image that is configured for rendering. In this way, the capture support data may expand data available to the digital image processor as part of generating the digital image. This may also enable the techniques to take advantage of existing image editing functionality of the digital image processor, even when part of a "closed system."

Capture support data may be configured in a variety of ways to support a variety of functionality as part of generation of the digital image, e.g., into a form configured for rendering. The capture support data, for instance, may include data that is also in a raw image format to supplement the raw image data captured by the image sensor, such as to support object removal, hole filling, patch-based image processing techniques, noise removal, and so forth. For example, the capture support data may provide support for removal of clouds from the digital image of an image scene based on another digital image of the same image scene that does not include clouds.

In another example, the capture support data is configured to guide the generation of the digital image. Examples of which include capture support data that specifies image processing functionality employed for editing similar digital images (e.g., color palettes, filters, color saturation, composition functionality), settings employed by other image capture devices to capture similar digital images (e.g., lens and shutter speeds), and so forth. This data may then be used to specify image editing functionality to be employed as part of generating the digital image by the digital image processor into a form that is fit for rendering. In this way, the pre-capture system may expand functionality that is available to the digital image processor over conventional techniques that are limited to processing of the digital image after the image has already been generated. The capture support data may thus be configured as generic or specific to a given image scene, e.g., specific instructions based on image data of the image scene.

In a further example, the capture support data is obtained via a network to guide generation of a digital image before receipt of a user input to initiate capture of the digital image. The pre-capture system, for instance, may obtain the capture support data to guide generation of the digital image before or after processing by a digital image processor. As a result, functionality used to generate the digital image may be expanded even before a user decides to capture the image. Further discussion of these and other examples is included in the following sections and shown in corresponding figures.

In the following discussion, an example environment is first described that may employ the pre-capture techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ pre-capture techniques described herein. The illustrated environment 100 includes a computing device 102 and an imaging support system 104 that are communicatively coupled, one to another, via a network 106, e.g., the Internet. Computing devices that implement the computing device 102 and imaging support system 104 may be configured in a variety of ways.

A computing device, for instance, may be configured as a desktop computer, a laptop computer, a mobile device (e.g., assuming a handheld configuration such as a tablet or mobile phone as illustrated), and so forth. Thus, the computing device may range from full resource devices with substantial memory and processor resources (e.g., personal computers, game consoles) to a low-resource device with limited memory and/or processing resources (e.g., mobile devices). Additionally, although a single computing device is shown, a computing device may be representative of a plurality of different devices, such as multiple servers utilized by a business to perform operations "over the cloud" as illustrated for the imaging support system 104 and as further described in relation to FIG. 7.

The digital medium environment 100 is further illustrated as including an image capture device 108 as part of the computing device 102 that is configured to generate a digital image 110. The digital image 110 is illustrated as stored in storage 112, e.g., a computer-readable storage medium, database, and so forth. Other examples are also contemplated, such as implementation of the image capture device 108 as a standalone device, i.e., a dedicated digital camera.

The image capture device 108 includes a pre-capture system 114 that is representative of functionality to communicate with a support manager module 116 of an imaging support system 104 via the network 106. As part of this communication, the pre-capture system 114 is configured to obtain capture support data 118 that is usable to supplement and/or guide generation of the digital image 110 by the image capture device 108, e.g., into a form configured for rendering or edit a form already configured for rendering.

The image capture device 108, for instance, may be used to capture a digital image 110 of an image scene 120 that includes the Eiffel Tower 122 and a cloud 124. As part of capturing this digital image 110, capture support data 118 is collected by the pre-capture system 114, which may be performed even before a user "presses a button" to initiate capture of the digital image 110. The capture support data 118 may then be used as part of generating the digital image 110 from raw image data collected from an image sensor of the image capture device 108. In the illustrated example, this is used to remove the cloud from the digital image 110 as rendered 126 by a display device 128. In this way, the capture support data 118 may be used as part of generation of the digital image 110 itself, and thus supports functionality as part of "pre-capture" of the digital image 110. A variety of other configurations of capture support data 118 are also contemplated, further discussion of which is included in the following sections.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Figure 2:
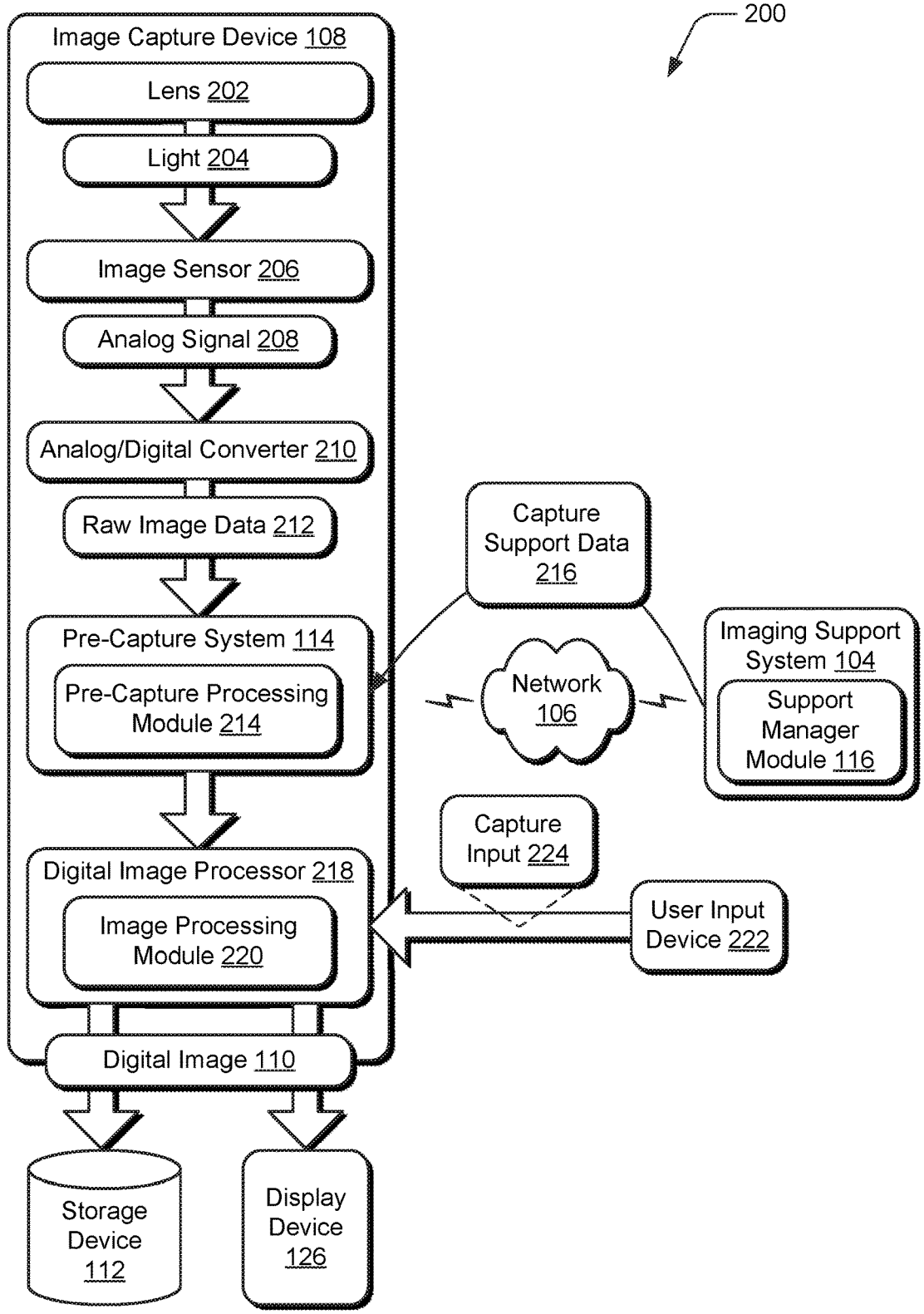
FIG. 2 depicts an example system showing an image processing pipeline of the image capture device of FIG. 1 in greater detail as including a pre-capture system.

FIG. 2 depicts an example system 200 showing an image processing pipeline of the image capture device 108 in greater detail as including the pre-capture system 114. The image processing pipeline begins with at least one lens 202 (e.g., and associated variable diaphragm) that is used to focus light 204 onto an image sensor 206. In one example, the image capture device 108 includes dual lenses 202 and image sensors 206, such as to support different focal lengths, parallax, and so forth. The image sensor 206 is configured to generate an analog signal 208 responsive to exposure to light 204, e.g., as a CCD or CMOS sensor. This analog signal 208 is then converted by an analog/digital converter 210 into raw image data 212, e.g., from a single image sensor 206 or multiple image sensors as part of a dual-lens system.

Raw image data 212 is a camera file format that contains minimally processed data from the image sensor 206. The raw image data 212, for instance, is not yet processed and thus is not configured for rendering, e.g., for display, printing, and/or editing with a bitmap graphics editor. Thus, raw image data 212 is also considered a "digital negative" in that the negative is not directly usable as a digital image, but has the information used to create the digital image.

The raw image data 212, for instance, may have a wider dynamic range or color gamut than a format used by the digital image 110 generated from this data. This is a result of capture by the raw image data 212 of radiometric characteristics of the image scene 120, i.e., physical information about light intensity and color of the image scene 120. As part of this, the raw image data 212 may store information accordingly to a geometry of photo-receptive elements of the image sensor 206 rather than as points (e.g., pixels) in the resulting digital image 110.

The raw image data 212 is illustrated in this example as being provided to the pre-capture system 114. The pre-capture system 114 includes a pre-capture processing module 214 that is representative of functionality implemented at least partially in hardware (e.g., an integrated circuit and memory) to obtain capture support data 216 from a support manager module 116 of an imaging support system 104 via a network 106. The pre-capture processing module 214, for instance, may form a request that is communicated to the imaging support system 104. In response, the support manager module 116 generates capture support data 216, which may include location of the capture support data 216 from memory, creation of the capture support data 216, and so forth. The request, for instance, may be based on the raw image data 212 itself, characteristics of a geographic location at which the image capture device 108 is disposed, and so forth. Thus, the capture support data 216 may also take a variety of forms as further described below.

The raw image data 212 and the capture support data 216 are then provided to a digital image processor 218, e.g., a digital signal processor, microcontroller, CPU of the image capture device 108, and so forth. The digital image processor 218 includes an image processing module 220 that is representative of functionality to generated the digital image 110 from the raw image data 212. As part of this, the image processing module 220 may also leverage capture support data 216, such as to guide generation of the digital image 110 or supplement the raw image data 212.

The capture support data 216, for instance, may describe settings, color pallets, color saturation, and so forth used to capture other digital images and thus guide image processing functionality used to edit the digital image as part of generation from the raw image data 212. In another instance, the capture support data 216 is used to supplement the raw image data 212, such as through configuration in a raw image format that together is used to generate the digital image 110 as further described in relation to FIG. 3.

The digital image 110, once generated, is illustrated as being output, e.g., for storage in a storage device 112, rendering by a display device 126, and so forth. As previously described, the digital image 110 is generated by the digital image processor 218 into a form ready for rendering, e.g., as a JPEG, TIFF, and so forth. Thus, in this example the capture support data 216 is employed to support editing and transformation of the digital image 110 even before the digital image 110 is generated, and thus is also referred to as use in "pre-capture" of the digital image.

In one example, the pre-capture system 114 is configured to form a request for capture support data 216 and even obtain the capture support data 216 before receipt of an input from a user to initiate the capture and generation of the digital image 110. The image capture device 108, for instance, may be associated with a user input device 222 that is configured to provide a capture input 224 to initiate capture of the digital image 110, e.g., a physical button, a virtual button displayed by the display device 126, and so forth. Even before "pressing the button," the pre-capture system 114 may collect data describing characteristics of a physical environment, in which, the image capture device 108 is disposed (e.g., a geographic location, amount of light, etc.), collect raw image data 212 that describes objects included in the physical environment that is not yet rendered by the image capture device 108, and so forth. This may thus support increased temporal and computational efficiency and real time generation of the digital image 110 by the digital image processor 218 that employs the capture support data 216.

Figure 3:
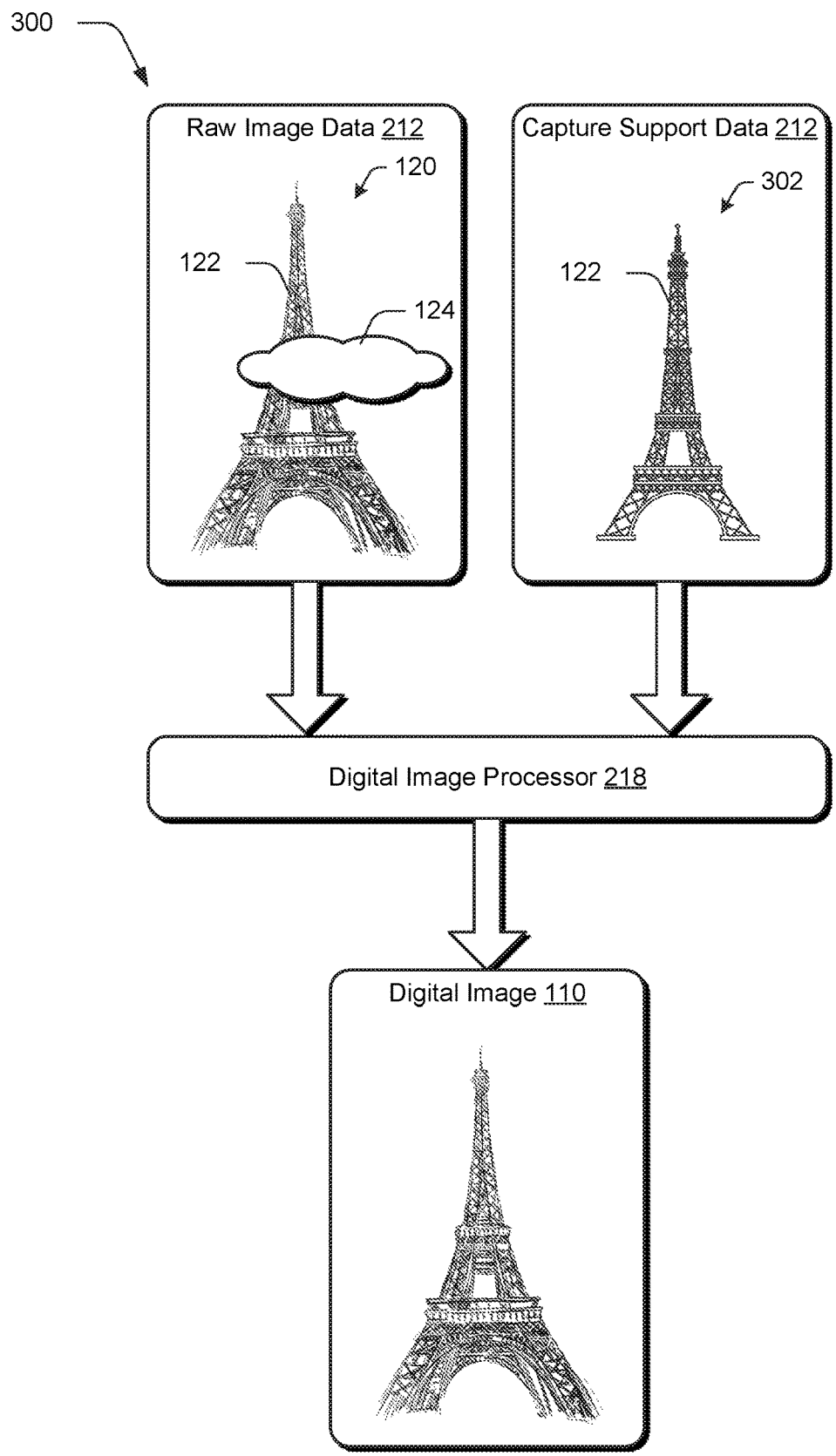
FIG. 3 depicts an example implementation in which capture support data is used to supplement image data as part of generating a digital image by a digital image processor.

FIG. 3 depicts an example implementation in which capture support data 216 is used to supplement raw image data 212 as part of generating a digital image 110 by a digital image processor 218. In this example, the raw image data 212 is taken of an image scene 120 that includes the Eiffel Tower and a cloud 124. Capture support data 216 is also obtained of an image scene 302 that includes the Eiffel tower 122, but not the cloud 124.

In one example, the pre-capture system 114 obtains the capture support data 212 based on a characteristic of a physical environment (e.g., a geographic location), through identification of an object included in the raw image data 212 by the imaging support system 104, and so on. The pre-capture system 114, for instance, may determine a current geographic location and "pre-fetch" the capture support data 212 even before a user removes the image capture device 108 from a pocket to generate the digital image 110. Thus, as previously described the capture support data 212 may be obtained before, after, or at a time of capture of the raw image data 212 by the image capture device.

Thus, in this example the capture support data 212 is also configured according to a raw image format to supplement the raw image data 212 collected by the image sensor 206 of the image capture device 108. In this way, the capture support data 212 is obtained from a source that is external to the image capture device 108 (e.g., the imaging support system 104) to supplement generation of the digital image 110 into a form that is configured for rendering.

In another example, the capture support data 216 is configured to supplement the raw image data 212 as part of interpolation in a manner similar to high dynamic range (HDR) images are captured, but through use of an external source. The capture support data 216, for instance, may be configured to address exposure, contrast, lighting and so forth in combination with the raw image data 212 to form the digital image 110. Thus, the capture support data 216 may be combined (e.g., interpolated with) the raw image data 212 to increase a likelihood that a resulting digital image 110 is visually pleasing. This may include use of a single or multiple instances of raw image data 212 and/or capture support data 216, e.g., a "burst" of raw image data 212, multiple examples of capture support data 216, and so forth. As a result, the capture support data 216 may be used to supplement the raw image data 212 from a source that may provide examples from different locations, at a different moment in time (e.g., for lighting issues), etc. Additional examples are described in the following discussion and shown in corresponding figures.

Figure 4:
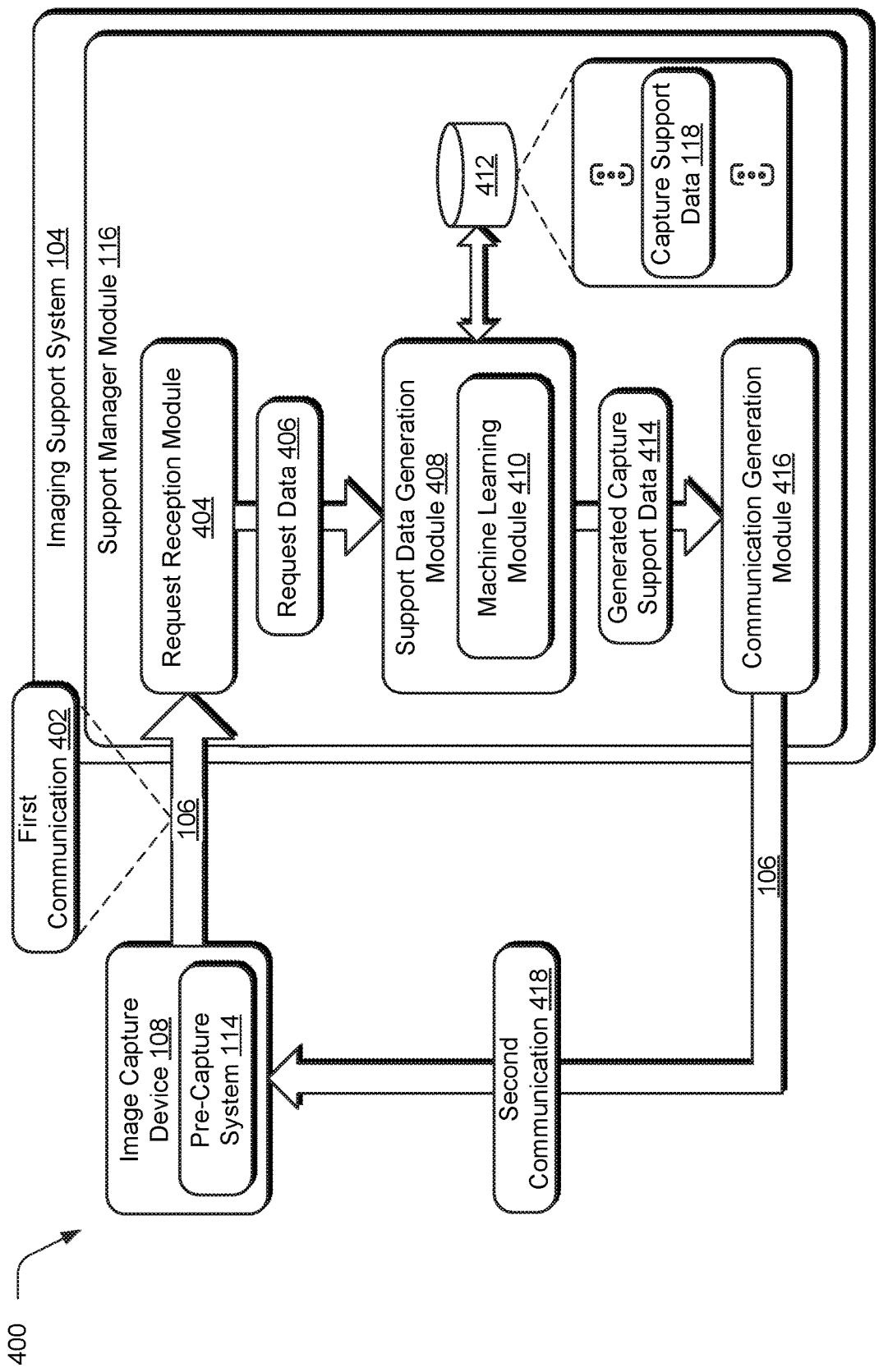
FIG. 4 depicts an example implementation in which capture support data is obtained by the pre-capture system of the image capture device of FIG. 2 via a network.

FIG. 4 depicts an example implementation 400 in which capture support data 118 is obtained by the pre-capture system 114 of the image capture device 108 via a network 106. To begin, the pre-capture system 114 forms a first communication 402 that is communicated over the network 106 to the support manager module 116 of the imaging support system 104. A request reception module 404, implemented at least partially in hardware of a computing device, receives this first communication 402 and from it extracts request data 406. The request data 406 may be configured to request a variety of different types of capture support data 118.

The request data 406, for instance, may specify characteristics of a physical environment, in which, the image capture device 108 is disposed. This may include a geographic location obtained through use of a global positioning system, cell tower triangulation, Wi-Fi access, and so on. Other characteristics of a physical environment include lighting conditions, time-of-day, calendar day, direction at which the image capture device 108 "is facing" (e.g., through use of a compass), altitude, and so forth.

The request data 406 may also specify settings used by the image capture device 108 to collect the raw image data 212, e.g., F-stop, shutter speed, filters, and so forth. The request data 406 may also be based on the raw image data 212 itself, e.g., include a down-sampled version of the raw image data, identify objects or materials in the image scene 120, and so forth.

The request data 406 is then employed by a support data location module 408 (e.g., and corresponding machine learning module 410) to generate capture support data 118, which is illustrated as included in a storage device 412. The machine learning module 410, for instance, may employ a model that is generated to support the different types of requests and corresponding capture support data 118.

Figure 5:
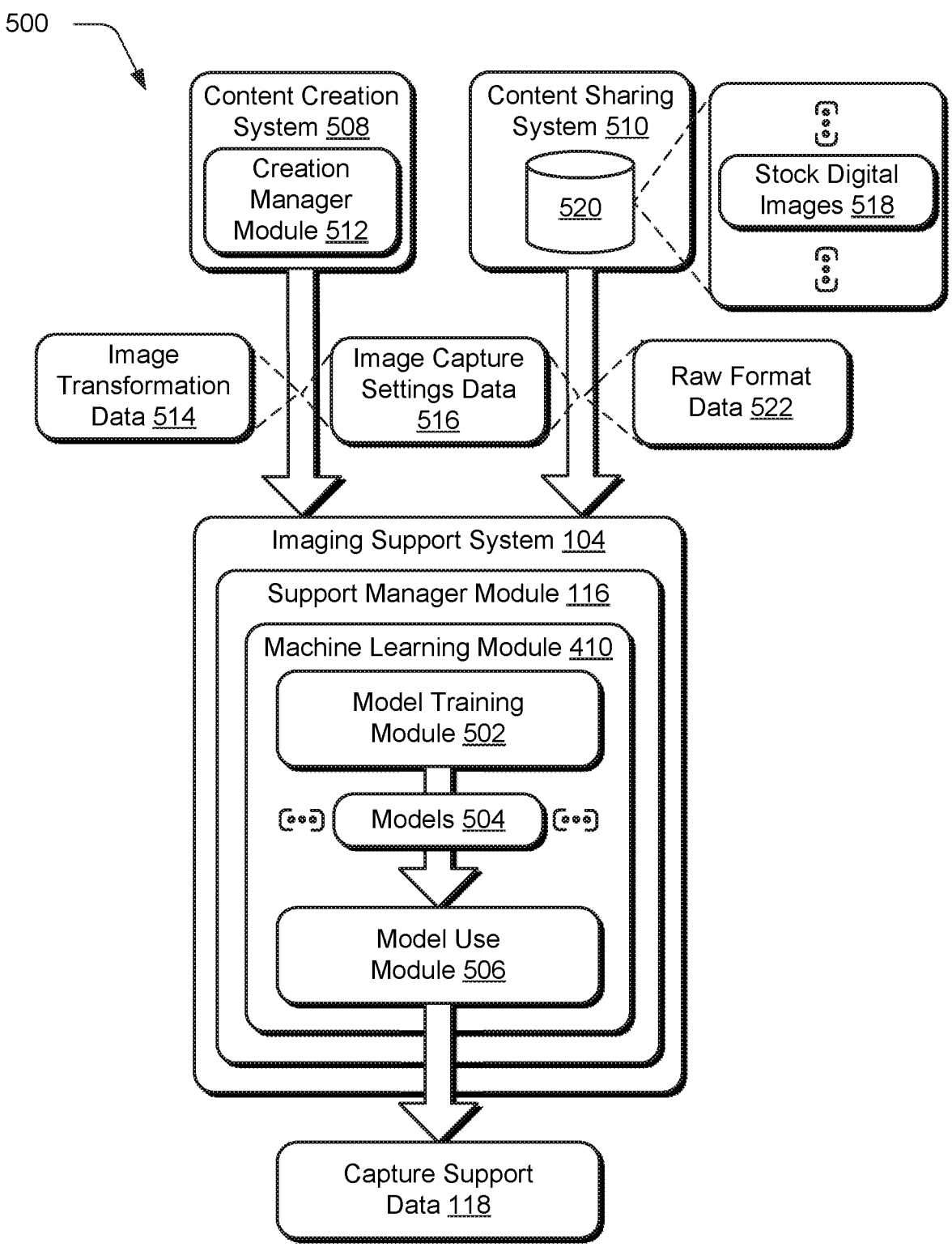
FIG. 5 depicts an example implementation in which capture support data is generated by the imaging support system of FIG. 4 using machine learning.

As shown in an example system 500 of FIG. 5, for instance, the machine learning module 410 includes a model training module 502 configured to generate models 504 using machine learning, e.g., through use of a neural network. The machine learning module 410 also includes a model use module 506 that is configured to use the models 504 to generate capture support data 118 as corresponding to the request data 406 extracted from the first communication 402.

The model training module 502 may train the models 504 in a variety of ways. In one illustrated example, the modeling training module 502 receives training data from a content creation system 508 and/or a content sharing system 510. The content creation system 508 is configured to provide content creation functionality that is usable to edit digital images and/or raw image data, which is represented by the creation manager module 512.

A user of computing device 102, for instance, may interact with the content creation system 508 via a network 106 to edit data, e.g., digital images generated by an image capture device. A result of monitoring of this interaction by the creation manager module 512 is captured as image transformation data 514 that then describes which image editing operations are performed to achieve "good" digital images. This determination of what is "good" may be performed manually (e.g., through receipt of user inputs via a user interface after display of training digital images) or automatically, e.g., through a model learned via machine learning. The image transformation data 514 may then be used to guide which editing operations are to be performed for similar digital images and even how this editing is to be performed. Therefore, in this example the models 504 are used by the model use module 506 to generate capture support data 118 to guide this editing as part of generation of the digital image 110.

Similar model training techniques may also be implemented by the model training module 502 based on image capture setting data 516 that describes how digital images are captured by image capture devices, e.g., images available via the content creation system 508, stock digital images 518 available via a storage device 520 of a content sharing system 510 (e.g., a stock-image database), and so forth. The image capture setting data 516, for instance, may be associated as part of metadata of a digital image, e.g., the stock digital images 518. The image capture settings data 516 may then be correlated with image transformation data 514 that also describes how these images are subsequently edited. Therefore, this combination may also be used to train models 504 which are then used to generate capture support data 118 based on the image capture settings used to capture raw image data 212 as well as how that image was subsequently modified to achieve a "good" result.

Thus, in the above examples the capture support data 118 is used to guide subsequent editing as part of generation of the digital image 110. Other examples of use of the capture support data 118 as a guide include use that is based on identification of a particular material within the image scene 120 (e.g., metal and precomputation of lighting profiles), color profiles, suggestions of composition, and so forth.

The imaging support system 104 may also be configured to generate capture support data 118 that is to be used to supplement the raw image data 212. The support manager module 116, for instance, may or may not use machine learning to generate raw format data that corresponds to an image scene 120 captured by the raw image data 212. As described in relation to FIG. 3, for instance, this may be used to support a variety of functionality, such as object removal as illustrated, hole filing, and so forth. Thus, in this example the raw format data 522 obtained "outside" of the image capture device 108 may be composited with the raw image data 212 to achieve a desired image editing result.

Returning again to FIG. 4, the generated capture support data 414 is provided from the support data location module 408 to a communication generation module 416. The communication generation module 416 is configured to form and transmit a second communication 418 via the network 106 to the pre-capture system 114 for use by the image capture device 108 in generating the digital image 110, e.g., to guide or supplement editing as part of generation of the digital image 110. In this way, functionality of the image capture device 108 may be expanded to support image editing even before the digital image 110 is generated into a form configured for rendering.

Example Procedures

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made to FIGS. 1-5.

Figure 6:
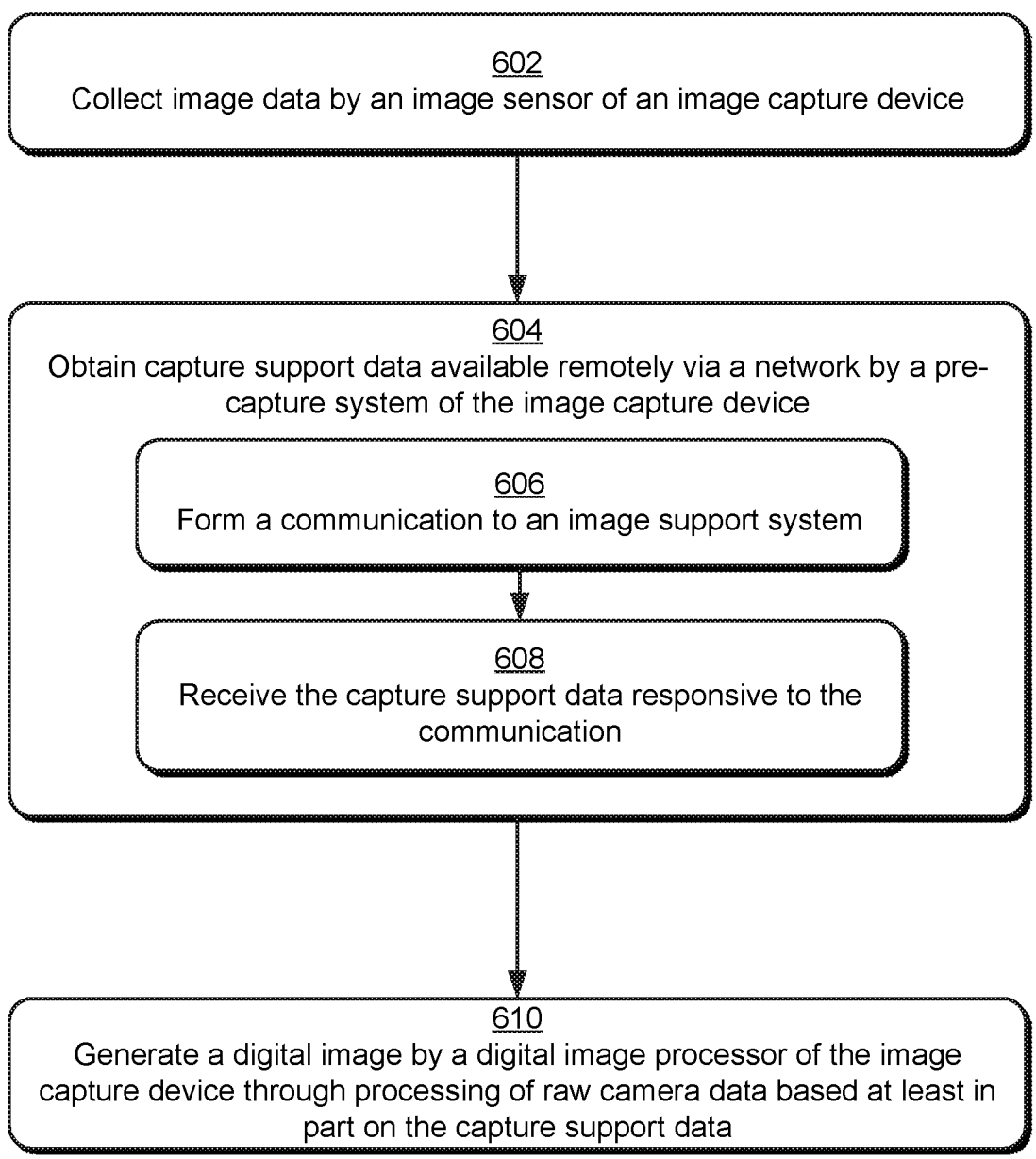
FIG. 6 is a flow diagram depicting a procedure in an example implementation in which a digital image is generated in a form that is configured for rendering based on image data and capture support data.

FIG. 6 is a flow diagram depicting a procedure in an example implementation in which a digital image is generated in a form that is configured for rendering based on raw image data and capture support data. Image data (e.g., raw image data 212) is collected through use of an image sensor 206 of an image capture device (block 602). Light 204, for instance, may be focused by a lens 202 onto the image sensor 206, which causes generation of an analog signal 208 that is then converted to raw image data 212 by an analog/digital converter 210. Other examples are also contemplated, such as through use of image data that is configured for rendering, such as JPEG, TIFF, and so forth.

Capture support data 216 is obtained by a pre-capture system 114 of the image capture device 108. The capture support data 216 is available remotely via a network 106 (block 604). For example, a communication (e.g., first communication 402) is formed for communication to an imaging support system 104 (block 606) by the pre-capture system 114. The capture support data 118 is received responsive to the communication (block 608), e.g., as a second communication 418 via the network 106.

A digital image 110 is generated by a digital image processor 218 of the image capture device 108 through processing the image data (e.g., raw image data 212) based at least in part of the capture support data 216 (block 610). The capture support data 216, for instance, may be used to guide or supplement editing of the raw image data 212 as part of generating the digital image 110 into a renderable form. A variety of other examples are also contemplated as discussed above, such as to further edit digital images that are in a renderable form before receipt of an input from a user to initiate capture of the digital image, e.g., for output as a preview image in a viewfinder, display device of a mobile phone, etc.

Example System and Device

Figure 7:
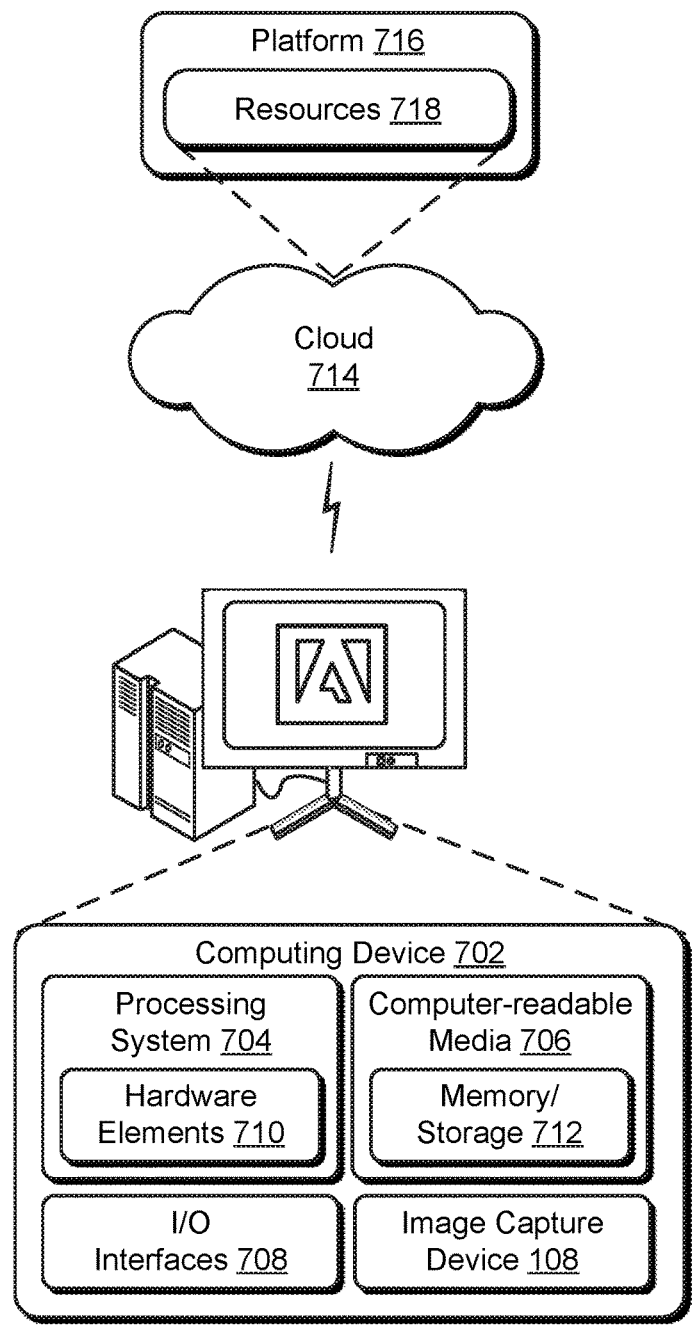
FIG. 7 illustrates an example system including various components of an example device that can be implemented as any type of computing device as described and/or utilize with reference to FIGS. 1-6 to implement embodiments of the techniques described herein.

FIG. 7 illustrates an example system generally at 700 that includes an example computing device 702 that is representative of one or more computing systems and/or devices that may implement the various techniques described herein. This is illustrated through inclusion of the image capture device 108. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to generate a digital image of an image scene, a method implemented by an image capture device, the method comprising:
   generating, by an image sensor of the image capture device, an analog signal of the image scene from light captured by at least one lens;
   converting, by an analog-digital converter of the image capture device, the analog signal into raw image data;
   identifying, by the image capture device, an object included in the raw image data before receiving a user input to initiate capture of the raw image data;
   obtaining, by a pre-capture system of the image capture device, capture support data from a source that is external to the image capture device based on the object included in the raw image data before receiving the user input to initiate capture of the raw image data, the capture support data generated at least partially through use of a neural network;

receiving, by a digital image processor from a user input device of the image capture device, the user input to initiate capture of the raw image data; and generating, by the digital image processor of the image capture device, the digital image through processing the raw image data based at least in part on the capture support data.

2. The method as described in claim 1, wherein the digital image processor is a microcontroller, digital signal processor, or imaging core.

3. The method as described in claim 1, wherein the digital image is configured for rendering by a display device.

4. The method as described in claim 1, wherein the capture support data is configured in a raw format.

5. The method as described in claim 1, wherein the capture support data describes at least one setting to be used as part of the generating of the digital image by the digital image processor.

6. The method as described in claim 5, wherein the at least one setting includes color, saturation, contrast, or an image filter.

7. The method as described in claim 1, wherein the obtaining includes forming a communication for communication to an imaging support system via a network and receiving the capture support data in response to the communication.

8. The method as described in claim 7, wherein the communication describes at least one object material included in the image scene.

9. The method as described in claim 7, wherein the communication describes at least one setting employed by the image capture device to collect the raw image data.

10. The method as described in claim 7, wherein the communication describes physical characteristics of the image scene.

11. The method as described in claim 10, wherein the physical characteristics include geographic location.

12. An image capture device comprising:
an image sensor to generate an analog signal of an image scene from light captured by at least one lens;
an analog-digital converter to convert the analog signal into raw image data;
a pre-capture system to:
identify an object included in the raw image data before receiving a user input to initiate capture of the raw image data; and
obtain capture support data from a source that is external to the image capture device based on the object included in the raw image data before receiving the user input to initiate capture of the raw image data, the capture support data generated at least partially through use of a neural network; and
a digital image processor to generate a digital image by processing the raw image data based at least in part on the capture support data.

13. The image capture device as described in claim 12, wherein the capture support data includes image data configured in a raw format.

14. The image capture device as described in claim 12, wherein the capture support data describes at least one setting to be used as part of generating the digital image by the digital image processor.

15. The image capture device as described in claim 12, wherein the capture support data is based on a geographic location of the image scene.

16. In a digital medium environment to generate a digital image of an image scene, computer-readable storage media storing instructions that, responsive to execution on a processing system of an image capture device, causes the processing system to perform operations comprising:
generating an analog signal of the image scene from light captured by at least one lens of the image capture device;
converting the analog signal into raw image data;
identifying an object included in the raw image data before receiving a user input to initiate capture of the raw image data;
obtaining capture support data from a source that is external to the image capture device based on the object included in the raw image data before receiving the user input to initiate capture of the raw image data, the capture support data generated at least partially through use of a neural network;
receiving the user input to initiate capture of the raw image data; and
generating the digital image by combining the raw image data and the capture support data.

17. The computer-readable storage media described in claim 16, wherein the capture support data includes image capture settings data.

18. The computer-readable storage media described in claim 17, wherein the image capture setting data is based on an additional digital image.

19. The computer-readable storage media described in claim 17, wherein the image capture setting data is based on an additional image capture device.

20. The computer-readable storage media described in claim 16, wherein the capture support data is configured in a raw format.

* * * * *